Feb. 28, 1939.  E. KOLOUCH  2,148,822
ELECTRIC COOKING AND FRYING APPARATUS
Filed Oct. 30, 1937
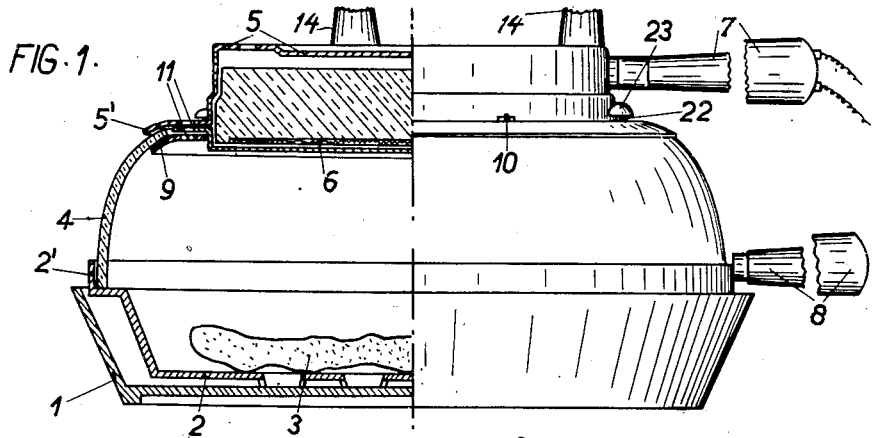
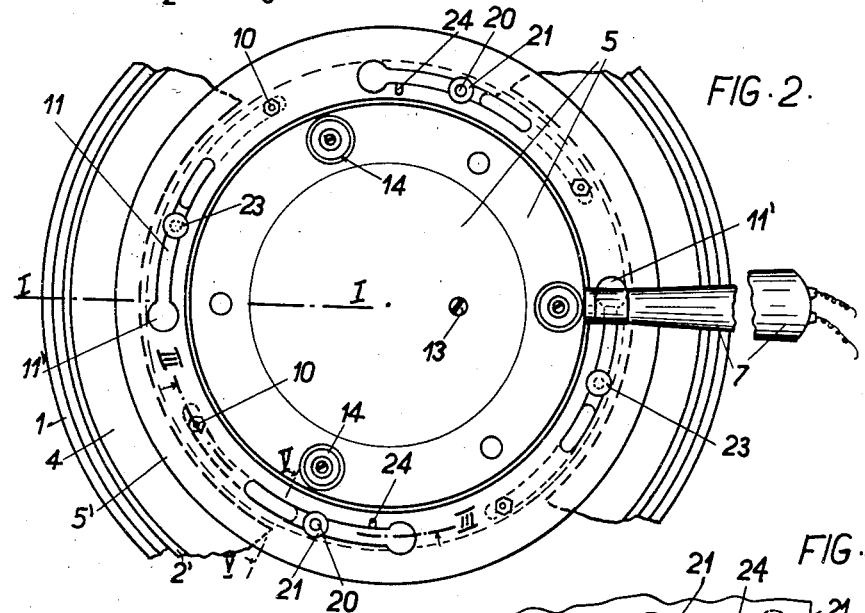
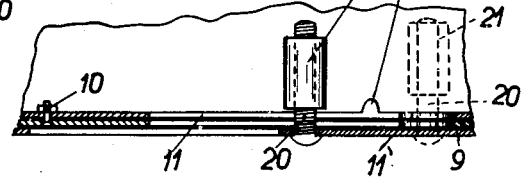
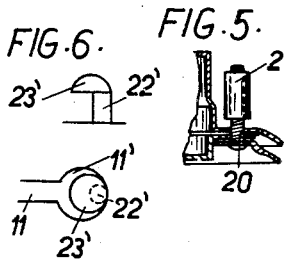
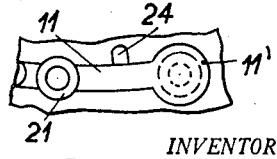
INVENTOR.
BY Emil Kolouch
ATTORNEY.

Patented Feb. 28, 1939

2,148,822

UNITED STATES PATENT OFFICE 2,148,822

ELECTRIC COOKING AND FRYING APPARATUS

Emil Kolouch, Prague, Czechoslovakia, assignor, by direct and mesne assignments, of forty per cent to Martha Stern, twenty per cent to Anna Grab, twenty per cent to Elisabeth Roman, all of Prague, Czechoslovakia, and twenty per cent to Eugene Stern, Philadelphia, Pa.

Application October 30, 1937, Serial No. 172,008
In Germany October 30, 1936

5 Claims. (Cl. 219—19)

The invention relates to an electrical cooking and roasting device in which a heating plate with electric resistances is provided in the top part of a bell-shaped partially transparent heating pan. This heating pan is turned upside down and disposed over a suitable dish on which lie the victuals to be roasted. The devices of this type which have become known up to the present have the disadvantage that the roasting or cooking process cannot be observed accurately without necessitating lifting the roasting pan whereby not only losses of heat are caused but also the roasting or cooking is retarded and consequently more electric current required. The supervision of the preparation or cooking of food requires more time under these circumstances. Electrical cooking and roasting apparatus have already become known which consist entirely or partly of glass to enable the observation of the baking or cooking process without the necessity of lifting the lid. The present invention however has the advantage over previous devices because the present device can be readily taken apart and repaired and cleaned when necessary.

In the cooking and roasting apparatus according to this invention the top includes a ring-shaped circumferential part made from transparent material, for instance, glass, and is separate from the other part of the apparatus which is made, for instance of metal or porcelain. The advantages of the apparatus according to the invention hereby obtained in comparison with known prior devices of this general character is that the middle part forming the heating top and carrying the heating wires, and of the glass-ring are cheaper to manufacture and on the other hand with separate manufacturing of these individual parts, may be more cheaply replaced. Furthermore the roasting and cooking apparatus may be given a thorough cleaning since the transparent ring is removable from the heating top for this purpose and also permits removal of the heat resistance.

The characteristic feature of the apparatus according to the invention consists in making the lateral wall of the top part of the device of a transparent, heat resisting material, for instance heat-proof glass, in such a way that it may be separated from the other part of the top, so that it is possible to continually observe the progress of the roasting or the like cooking operation without the necessity of removing the heating top part. On the circumferential edge of the heating unit housing suppported on the aforesaid transparent lateral wall are provided apertures which are adjustable in size for the complete or partial shutting off of the heating chamber from the outside. The size of these apertures is regulated according to the invention by turning a ring slide equipped with corresponding apertures and with two opposite pins serving as handles. These two pins may be adjusted with respect to limiting abutments on the edge of the guide slots in the supporting body by screwing sleeves upon the pins so that, when the sleeves are partly screwed up, the ring slide equipped with apertures can be turned beyond the limiting abutments until the pins together with the sleeves come within the range of a circular enlargement in the flange of the supporting body so that the pins and sleeves can be pulled through these apertures. The ring slide can then be lifted off together with the transparent ring for cleaning or in 'case that a vessel larger than the transparent ring is to be placed upon the heating top when it is desired to use the heater as such alone.

The heating top part is mounted on a perforated food supporting plate for the food, said supporting plate being arranged between the transparent ring and a member which forms the base plate and prevents burning of the table plate or the like. This supporting plate tightly shuts off the inner heating chamber at its circumferential edge and also prevents burning or sticking to the pan of the juices coming from the roasting meat. The progress of the roasting may be preferably regulated by adjusting the above mentioned apertures in the upper part of the top part, said apertures being adapted to be throttled as described above.

When using the transparent ring, not only a continuous observing of the roasting or cooking progress, without removing of the top part is made possible, but also the flowing off of the vapours forming during the roasting may be regulated. Heretofore it was impossible in the roasting devices with non-transparent walls to accurately observe the roasting or cooking process and each time the cooking vessel was opened for the purpose of inspecting the food the vapors were released so that the flowing off of vapors could not be regulated. Since the roasting bell need not be lifted during the whole roasting process up to the time that the victuals are cooked, a considerable saving of current is attained. Furthermore the supply of the electric energy can be regulated by means of a suitable device known per se, in accordance with the progress of the roasting which also was not possible up to the present, as the roasting process could not be continually observed.

An embodiment of the invention is illustrated, by way of example, in the accompanying drawing in which Fig. 1 shows the apparatus in side elevation and partly in a radial section on line I—I of Fig. 2.

Fig. 2 is a top plan view on the roasting pan.

Fig. 3 shows details of the device for adjusting the size of the apertures in the top part of the bell, shown in section on the curve line III—III of Fig. 2 and in larger scale.

Fig. 4 shows a top plan view of Fig. 3.

Fig. 5 shows a vertical section on line V—V in Fig. 2.

Figs. 6 and 7 show details of modified construction.

In the apparatus shown by way of example a perforated dish-shaped supporting plate 2 is placed in a dish 1, the juices obtained from the meat 3 during roasting process drop through the perforations onto the dish 1. Plate 2 has at its circumference an upwardly turned edge 2' which engages a ring 4 of transparent heatproof material, for instance heat-proof glass. This ring forms part of the frying pan 5 which contains in its top part a heating plate with an electric resistance 6 of known type. The electric current is supplied to the heating plate by means of insulated wires extending through the hollow handle 7. The perforated dish-shaped supporting plate 2 also has a handle 8, in order that either the whole roasting device or only parts of the same can be moved or adjusted.

The upper edge of the transparent ring 4 is located between the horizontal flange 5' of the body of the frying pan 5, made of metal or similar material and the flat ring 9 serving as a ring-shaped slide and fixed on flange 5' by means of some rivets or in some other suitable manner, for instance by means of two opposite screw-threaded pins 20, on each of which a sleeve 21 is screwed which forms a kind of handle. The pins 20 or 22 respectively are fixed at the lower end on the ring-shaped slide 9 and are guided in arc-shaped narrow apertures 11 in flange 5' of body 5. These arc-shaped slots 11 have at one end a circular enlargement 11', the diameter of which is slightly greater than the diameter of the sleeve 21 screwed upon the pins 20. The diameter of these sleeves is, however, greater than the width of the slots 11. The two pairs of pins 20 and 22 therefor slide in the corresponding arc-shaped pairs of apertures 11 (Fig. 2) located diametrically opposite from each other. The heads 23 of the pins 22 also have a greater diameter than the width of the apertures 11, but a somewhat smaller diameter than the circular enlargements 11' at the end of the corresponding apertures. The ring slide 9 has arc-shaped slots without enlargements so that when the ring 9 is turned relative to the stationary flange 5' of the pan 5 the apertures 11 overlap completely or partly. The ring 4 engages only approximately up to half of the width of the two ring-shaped parts 5' and 9 so that it does not overlap the apertures 11. Stops 24 are provided to prevent turning of the ring slide until the pins 20 with their sleeves can drop through the enlargements 11'. These upwardly directed stops 24 (Figs. 2 to 4) are produced by pressing in the slot wall of the ring flange 5' close to these enlargements 11'. The pin 20 with sleeve 21 cannot be pushed over these abutments in case the sleeve is screwed down as shown in Fig. 3 in thick lines. If, however, the sleeve 21' is loosed, as shown in Fig. 3 in broken lines, the ring slide 9 together with the pins 20 and the sleeves 21 can turn beyond the stops 24, and the ring slide 9 together with the transparent ring 4 can be removed from the body 5 of the top part.

The heating plate 6 is fixed on the pan 5 by means of screws 13 or in another suitable manner. On the outer side of the frying pan and on its upper horizontal boundary face several insulating supports 14, known per se, are arranged in order that the pan after having been lifted off can be placed on these insulating supports.

By the arrangement of a transparent ring 4 with ventilation apertures 11 and 12 adapted to be throttled and of the perforated dish-shaped supporting plate 2 a perfect and rapid preparing of food by roasting, stewing or cooking and without loss of heat and without interruption of the cooking process caused by the repeated lifting of the top part, is possible. The arrangement makes it possible to observe the cooking progress constantly until the food is cooked to the desired extent through the transparent ring and the apertures 11, 12 may be adjusted as may be necessary during the cooking operation.

The pins 22 in the form of the construction shown in Figs. 1 and 2 have a simple enlarged head 23, however, they may be equipped with a head 23' arranged eccentrically to the axis of the pin as shown in Figs. 6 and 7 in side elevations and top plan view. This arrangement presents the advantage that the shank 22', when the pins are being shifted up to the edge of the corresponding aperture 11', bears against this edge, the head part 23' being concentric to the circular edge 11' so that the pin 22', 23' can in this extreme position of the pin in the aperture 11, 11' pass through the same.

I claim:—

1. An electric frying pan adapted to be turned upside down, comprising: a bell shaped frying pan, a heating body forming the central part of said frying pan and adapted to be removed therefrom, an electric heating unit in said heating body, the side wall of said bell shaped frying pan surrounding said heating body being in the shape of a ring of heat resistant transparent material, and a dished plate adapted to receive the free edge of said transparent ring and also adapted to support the food being cooked when the pan is in its upside down position.

2. An electric frying pan as defined in claim 1, including: means for detachably fastening said heating body to said ring of heat resistant transparent material, said means including a projecting rim for clamping said heating body and said ring together, said rim having arcuate slots, an arc shaped slide member in engagement with said rim and adapted to be moved with respect to and over said arcuate slots, each of said arcuate slots having a circular enlarged portion at one end thereof, a plurality of pins carried by said arc shaped slide member and projecting through the corresponding arcuate slots, formed in said rim sleeves, each of said sleeves surrounding a portion of one of said pins, each of said sleeves being of slightly smaller outer diameter than the inner-diameter of the corresponding circular enlarged portion of the arcuate slot associated therewith but of larger diameter than the width of said arcuate slot.

3. An electric frying pan as defined in claim 1, including: means for detachably fastening said heating body to said ring of heat resistant transparent material, said means including a pair of projecting rim members attached to said heating body for clamping portions of said ring therebetween, said rim members having arcuate slots formed therein to permit vapors from food being cooked in said pan to escape therefrom, means for regulating the size of the openings formed by said arcuate slots, each of said arcuate slots having a circular enlarged portion at one end thereof, a plurality of pins for holding said rim members in damping relation, a pin projecting through each of said arcuate slots, and a sleeve threaded to each of said pins, said sleeve being of slightly smaller outer diameter than the inner diameter of the corresponding circular enlarged portion of the arcuate slot associated therewith but of larger diameter than the width of said arcuate slot to permit said heating body and said transparent ring to be disassembled readily.

4. An electric frying pan as defined in claim 1, including: means for detachably fastening said heating body to said ring of heat resistant transparent material, said means including a pair of projecting rims attached to said heating body for clamping portions of said ring therebetween, said rims having arcuate slots cut therethrough to permit vapors from food being cooked in said pan to escape therefrom, adjustable means for controlling the size of the openings formed by said arcuate slots, each of said arcuate slots having a circular enlarged portion at one end thereof, a plurality of pins each having a head eccentrically disposed thereon, one of said pins projecting through each of said arcuate slots in such a way that the head of the pin disengages the sides of the corresponding slot when shifted to the circular enlarged portion to facilitate disassembling the said heating body and the said heat resistant transparent ring for cleaning.

5. An electric frying pan adapted to be turned upside down, comprising: a bell shaped frying pan, a heating body with electric resistances centrally disposed in said pan, said pan having an annular downwardly extending and detachable circumferential wall part of transparent material around said heating body, and a dished plate adapted to engage the lower edge of said wall part of transparent material to support said pan in upside down position.

EMIL KOLOUCH.